United States Patent [19]
Suzuki et al.

[11] Patent Number: 5,329,557
[45] Date of Patent: Jul. 12, 1994

[54] DIGITAL DATA RADIO TRANSMISSION SYSTEM

[75] Inventors: Kazuhiro Suzuki, Sendai; Eiji Suzuki, Ohtawara, both of Japan

[73] Assignee: Fujitsu Limited, Kawasaki, Japan

[21] Appl. No.: 754,449

[22] Filed: Sep. 3, 1991

[30] Foreign Application Priority Data

Sep. 5, 1990 [JP] Japan .................................. 2-233369
Mar. 20, 1991 [JP] Japan .................................. 3-057416

[51] Int. Cl.$^5$ .............................................. H04L 7/00
[52] U.S. Cl. ..................................... 375/112; 375/118
[58] Field of Search ....................... 375/106, 112, 118; 370/100.1, 101, 102, 105.1, 105.3, 108

[56] References Cited

U.S. PATENT DOCUMENTS

| | | | |
|---|---|---|---|
| 4,002,844 | 1/1977 | Doussoux | 370/102 |
| 4,823,365 | 4/1989 | Loginov | 370/108 |
| 4,928,275 | 5/1990 | Moore et al. | 370/102 |
| 4,965,884 | 10/1990 | Okura et al. | 375/106 |
| 5,128,939 | 7/1992 | Takatori et al. | 370/100.1 |
| 5,146,477 | 9/1992 | Cantoni et al. | 375/112 |

FOREIGN PATENT DOCUMENTS

88/07300 9/1988 PCT Int'l Appl. .

OTHER PUBLICATIONS

Rokugo et al., "An Asynchronous DS3 Cross-Connect System with Add/Drop Capability", IEEE Global Telecommunications Conference, Nov. 28-Dec. 1, 198, Hollywood, Florida, U.S.; Conference Record, vol. 3, No. 3 of 3, pp. 1555-1559; IEEE, New York, U.S., 1988.

*Primary Examiner*—Stephen Chin
*Assistant Examiner*—Young Tse
*Attorney, Agent, or Firm*—Staas & Halsey

[57] ABSTRACT

A digital data radio transmission system for reproducing pre-velocity-modulation input frame data from the radio frame data subjected to velocity modulation and pulse insertion. The system includes a write counter that divides write clock pulses under control of frame position pulses to output write pulses; an elastic memory that temporarily stores the input frame data and the frame position pulses as per the write pulses; and a timing pulse generator that outputs control pulses in response to the supply of read clock pulses under control of the frame position pulses from the elastic memory. The system further comprises a read counter that divides the write clock pulses by the same number as with the division by the write counter to output read pulses; and a pulse inserting section that inserts pulses into the output frame data read from the elastic memory as per the read pulses to generate the radio frame data. Because the control operations involved are performed in accordance with the frame position pulses, the input frame data matches the radio frame data in terms of frame phase.

2 Claims, 5 Drawing Sheets

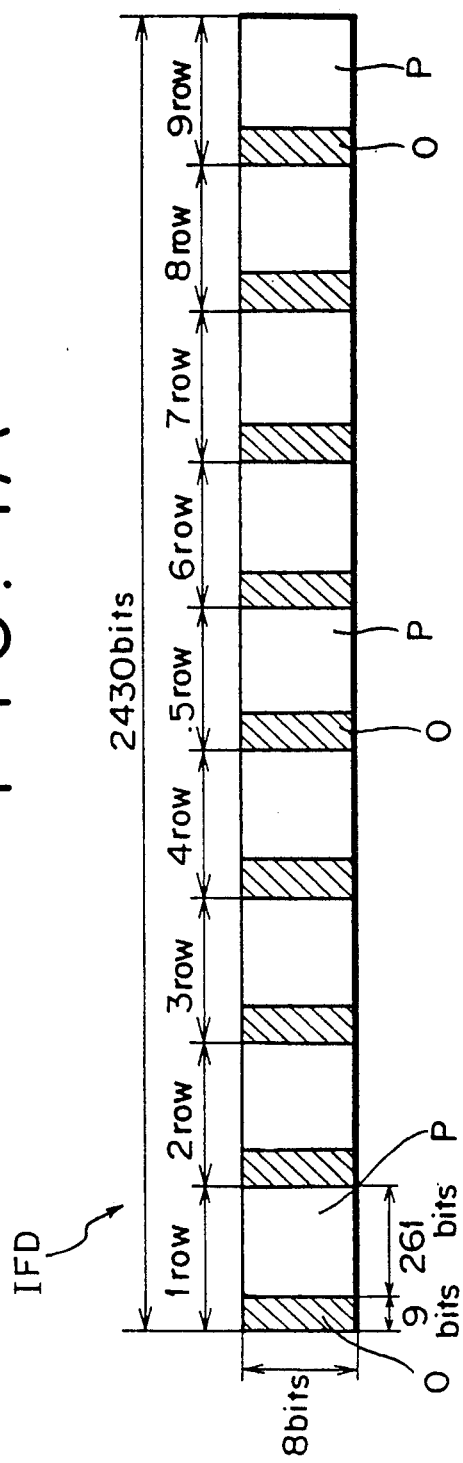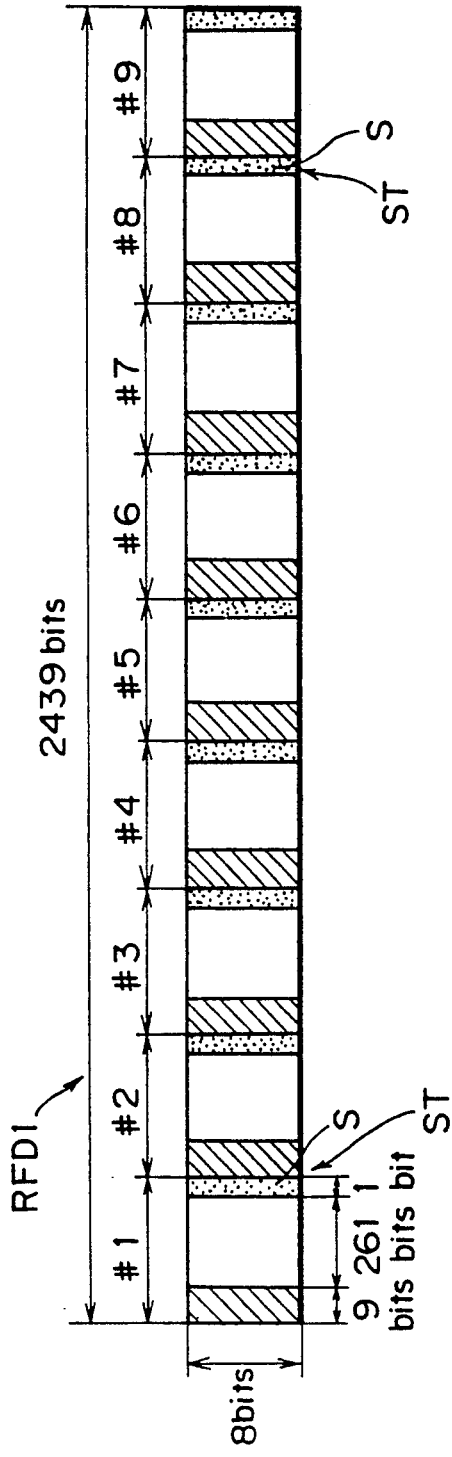

DIGITAL DATA RADIO TRANSMISSION SYSTEM

BACKGROUND OF THE INVENTION

1. Field of the Invention

The present invention relates to a digital data radio transmission system.

2. Description of the Prior Art

Digital data radio transmission systems involve having the transmitting side subject input frame data to velocity modulation and pulse insertion in order to transmit to the receiving side such signals as frame synchronizing, auxiliary and control signals. Generally, no compatibility exists between the format of input frame data and that of radio frame data after velocity modulation. This makes it impossible for a repeater station to reproduce the input frame data from the radio frame data. The same applies to a digital data radio transmission system that is built in accordance with the so-called network node interface (NNI) protocol.

A transmitter of a typical prior art digital data radio transmission system is described below with reference to FIG. 1. This transmitter subjects eight-bit parallel input data to velocity modulation and pulse insertion so as to generate eight-bit parallel output data for radio transmission to a repeater station.

In FIG. 1, reference numeral 1 denotes a sextet write counter. The write counter 1 divides input write clock pulses WCK by six (6). The divided pulses are output as write pulses WP to an elastic memory 2. The elastic memory 2 is an eight (8) bit by six (6) bit memory that stores input frame data IFD whose format is defined by the NNI, as shown in FIG. 2A. The elastic memory 2 admits and stores the input frame data IFD as per the write pulses WP, and outputs the data in accordance with read pulses RP. The output data is data that has undergone velocity modulation.

The input frame data IFD depicted in FIG. 2A is eight-bit parallel data, one frame of which contains 2,430 bits. Each frame is assigned a frequency of 8 kHz. In addition, one frame comprises nine (9) sub-frames, i.e., 1 row through 9 row, each sub-frame being made of a nine-bit overhead part O shaded in the figure and a 261-bit payload part P. Maintenance-related signals are inserted into the overhead part P while communication information is inserted into the payload part P.

Referring again to FIG. 1, the write pulses RP destined to the elastic memory 2 are read from a read counter 3 comprising a sextet counter. The read counter 3 admits read clock pulses RCK and clock inhibit control pulses IP, and outputs the write pulses RP. The clock inhibit control pulses IP are generated by a timing pulse generator 4 that admits the read clock pulses RCK.

When the data in the elastic memory 2 is read therefrom in accordance with the read clock pulses RCK and is output as output frame data OFD, the clock inhibit control pulses IP are used to place blank bits in the date OFD. That is, as depicted in FIG. 2B showing the format of radio frame data RFD, each 270-bit sub-frame (#1-#8) is followed by a one-bit slot ST.

A pulse inserting section 5 shown in FIG. 1 inserts an auxiliary signal S in each slot ST. These slots and sub-frames constitue radio frame data RFD that is transmitted to a repeater station, not shown.

In the above-described prior art digital data radio transmission system, the input frame data IFD depicted in FIG. 2A is subjected to velocity modulation and then to pulse insertion so as to form the radio frame data RFD of FIG. 2B. Because the input frame data IFD is out of frame phase with the radio frame data RFD and because the radio frame data RFD after velocity modulation is slightly narrower in bit width than the input frame data IFD, the two kinds of data differ from each other in terms of frame period. The mismatch in frame period between input frame data and radio frame data makes it impossible to reproduce the IFD from the RFD.

More specifically, when a repeater station receives radio frame data RFD, the station cannot gain access to the overhead part 0 of input frame date IFD in the NNI-defined initial format and is hence incapable of reproducing the IFD. This disadvantage leads to further disadvantages including the inability of the repeater station to add, delete or modify the data it handles. Such problems have conventionally hampered the system operation considerably.

SUMMARY OF THE INVENTION

It is therefore an object of the present invention to overcome the above-described drawbacks and disadvantages of the prior art and to provide a digital data radio transmission system capable of reproducing pre-velocity-modulation input frame data from post-velocity-modulation radio frame data.

In accordance with an aspect of the present invention, there is provided a digital data radio transmission system for velocity-modulating input frame data, adding pulses of a predetermined number of bits to the input frame data, and transmitting the resulting data as radio frame data, the system comprising: frame position pulse generating means; writing means for dividing write clock pulses under control of the frame position pulses generated by the frame position pulse generating means, the writing means thereafter outputting the divided write clock pulses as write pulses; storing means for temporarily storing the input frame data and the frame position pulses according to the write pulses; timing pulse generating means for outputting control pulses in response to the supply of read clock pulses, the operation of the timing pulse generating means being controlled by use of the frame position pulses coming from the storing means; reading means for dividing the read clock pulses by the same number as with the dividing by the writing means under control of the control pulses, the reading means thereafter outputting the divided read clock pulses as read pulses; and pulse inserting means for generating the radio frame data by inserting pulses under control of the timing pulse generating means into the output frame data coming from the storing means in response to the write pulses.

When practiced as described above, the invention allows the output radio frame data to match the input frame data in terms of frame phase. This is brought about through two primary features: one feature is that input frame data is written to the storing means under control of the write pulses based on the frame position pulses; the other feature is that the data in the storing means is read therefrom under control of the read pulses based on the same frame position pulses. Thus when a repeater station receives radio frame data, the station can gain access to the overhead part of the input frame data in accordance with the radio frame data. This allows the repeater station easily to reproduce the input frame data.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4A shows the input frame data format which is substantially the same as that shown in FIG. 2A and which complies with the NNI standard;

FIG. 4B depicts the format of the radio frame data transmitted by the transmitter of the embodiment shown in FIG. 3.

DESCRIPTION OF THE PREFERRED EMBODIMENTS

Figure 3:
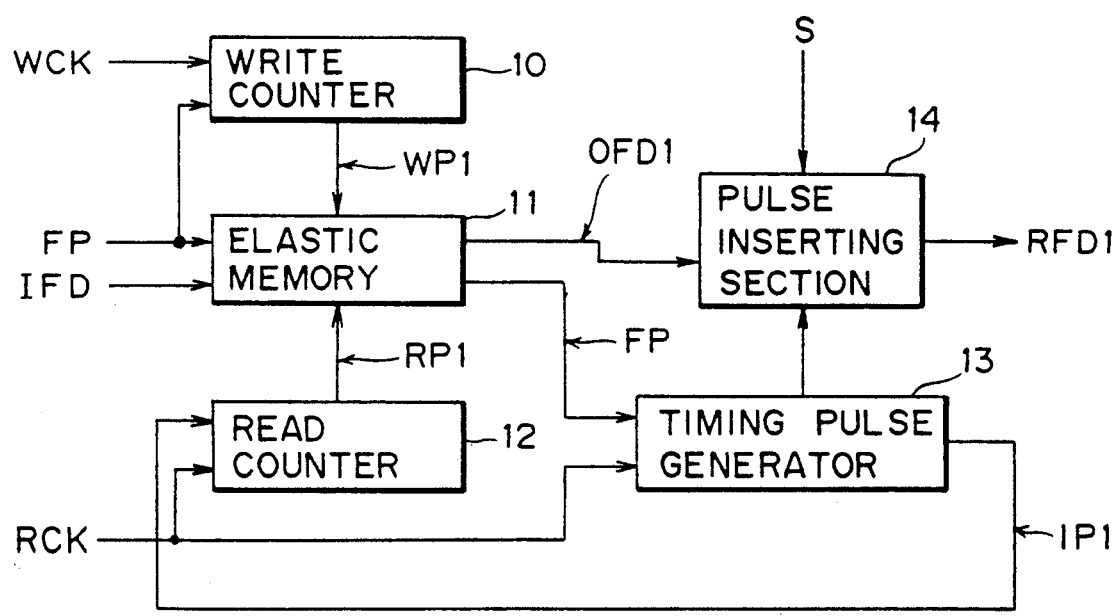
FIG. 3 is a block diagram of a transmitter of a digital data radio transmission system according to a first embodiment of the invention.

Referring to FIG. 3, the first embodiment of the invention is described below. In FIG. 3 reference numeral 10 denotes a write counter made of a sextet counter. The write counter 10 divides input write clock pulses WCK by six (6), and outputs six (6) series of write pulses WP1, two adjacent series being apart by one bit. The operation phase of the write counter 10 is controlled according to frame position pulses FP.

Figure 1:
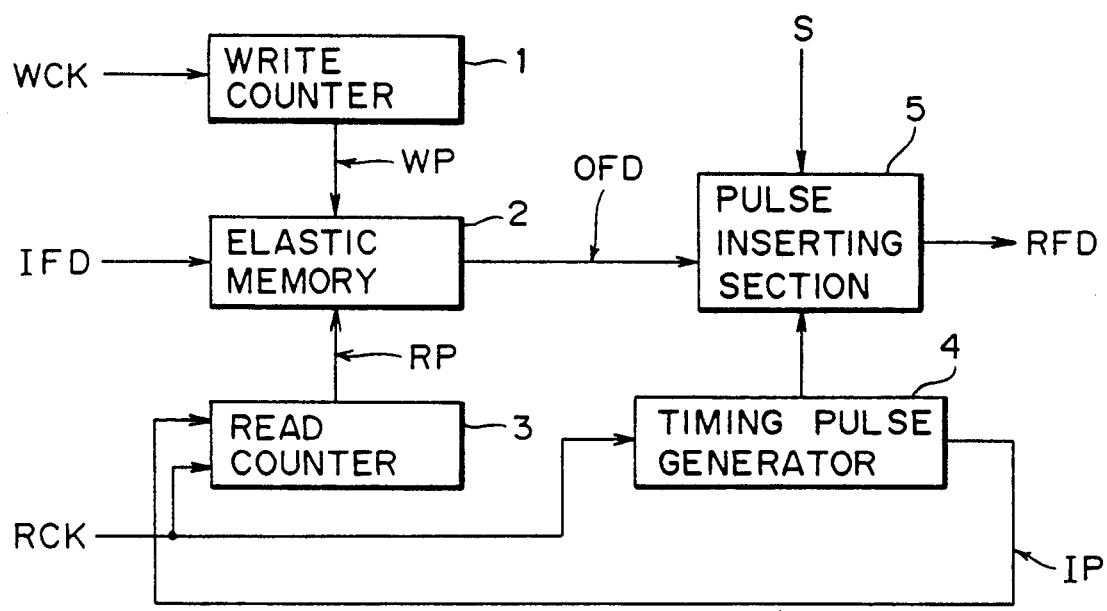
FIG. 1 is a block diagram of a transmitter of the typical prior art digital data radio transmission system.
Figure 2A:
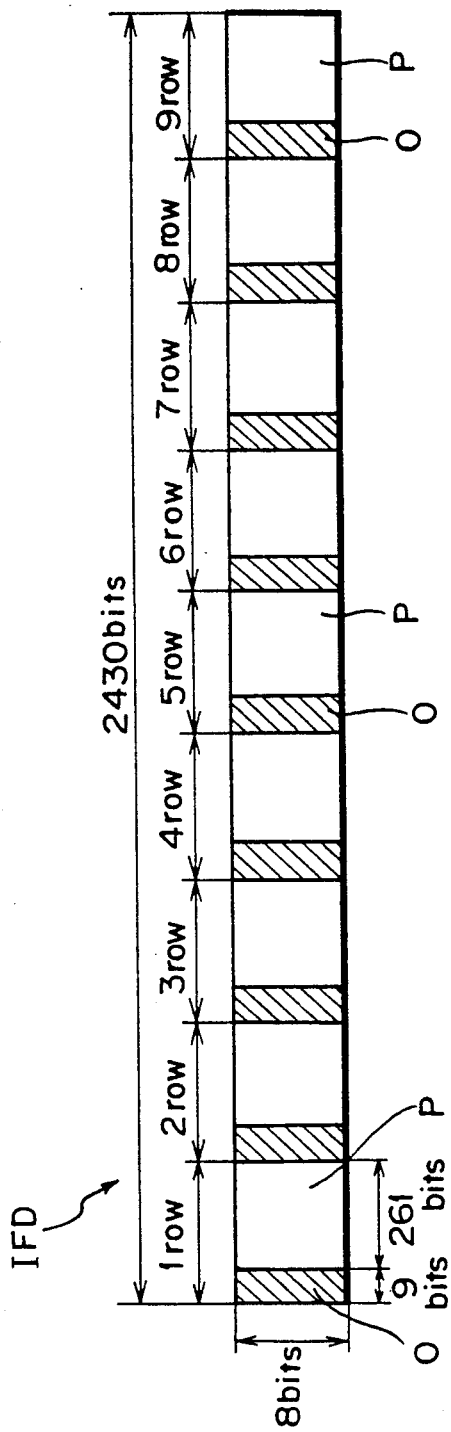
FIG. 2A depicts the prior art format of input frame data.
Figure 2B:
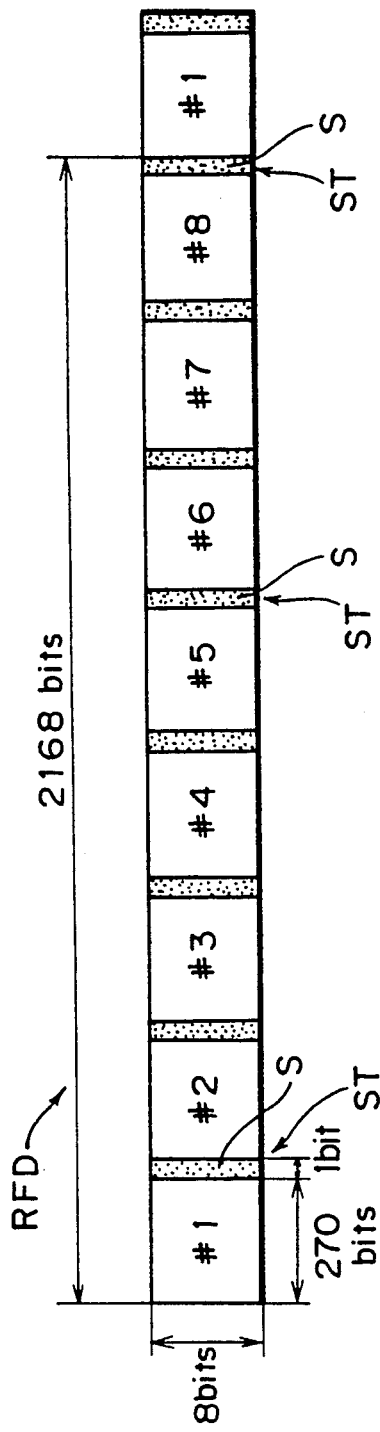
FIG. 2B illustrates the prior art format of radio frame data.

Reference numeral 11 denotes a nine (9) bit by six (6) bit elastic memory. The memory 11 admits and stores the input frame data IFD shown in FIG. 4A and the frame position pulses FP in accordance with the write clock pulses WCK. The input frame data IFD is the same as that illustrated in FIG. 2A.

Reference numeral 12 denotes a read counter constituted by a sextet counter. The read counter 12 divides input read clock pulses RCK by six (6), and generates six (6) series of read pulses RP1. The read pulses RP1 are used to read data from the elastic memory 11. Concurrently with the data read operation, the frame position pulses FP are read from the elastic memory 11. The frame position pulses FP are input to a timing pulse generator 13 to control the operation phase thereof. The timing pulse generator 13 outputs clock inhibit control pulses IP1 to the read counter 12 for control thereof in operation phase. While output frame data OFD1 is being read from the elastic memory 11 as per the read pulses RP1, the clock inhibit control pulses IP1 are used to form one-bit slots ST in the OFD1.

The output frame data OFD1 output from the elastic memory 11 after velocity modulation matches the input frame data IFD in terms of frame phase. The reason for the match is twofold. On the one hand, the input frame data IFD is written to the elastic memory 11 according to the write pulses WP1 based on the frame position pulses FP; on the other hand, the output frame data OFD1 is read from the elastic memory 11 in accordance with the read pulses RP1 based on the same frame position pulses FP.

A pulse inserting section 14 inserts an auxiliary signal S into each slot ST of the output frame data OFD1 under control of the timing pulse generator 13. This provides radio frame data RFD1, one frame of which is 2,439 bits long as depicted in FIG. 4B. The frame phase of the radio frame data RFD1 matches that of the input frame data IFD.

Thus when a repeater station receives the radio frame data RFD1 output by the transmitter, the station can access both the overhead part 0 and the payload part P of the input frame data IFD in accordance with the radio frame data RFD1. This enables the repeater station to reproduce the input frame data IFD with ease. Once reproduced, the input frame data IFD may be modified, deleted or supplemented by the repeater station. This enhances the flexibility of the system.

Figure 5:
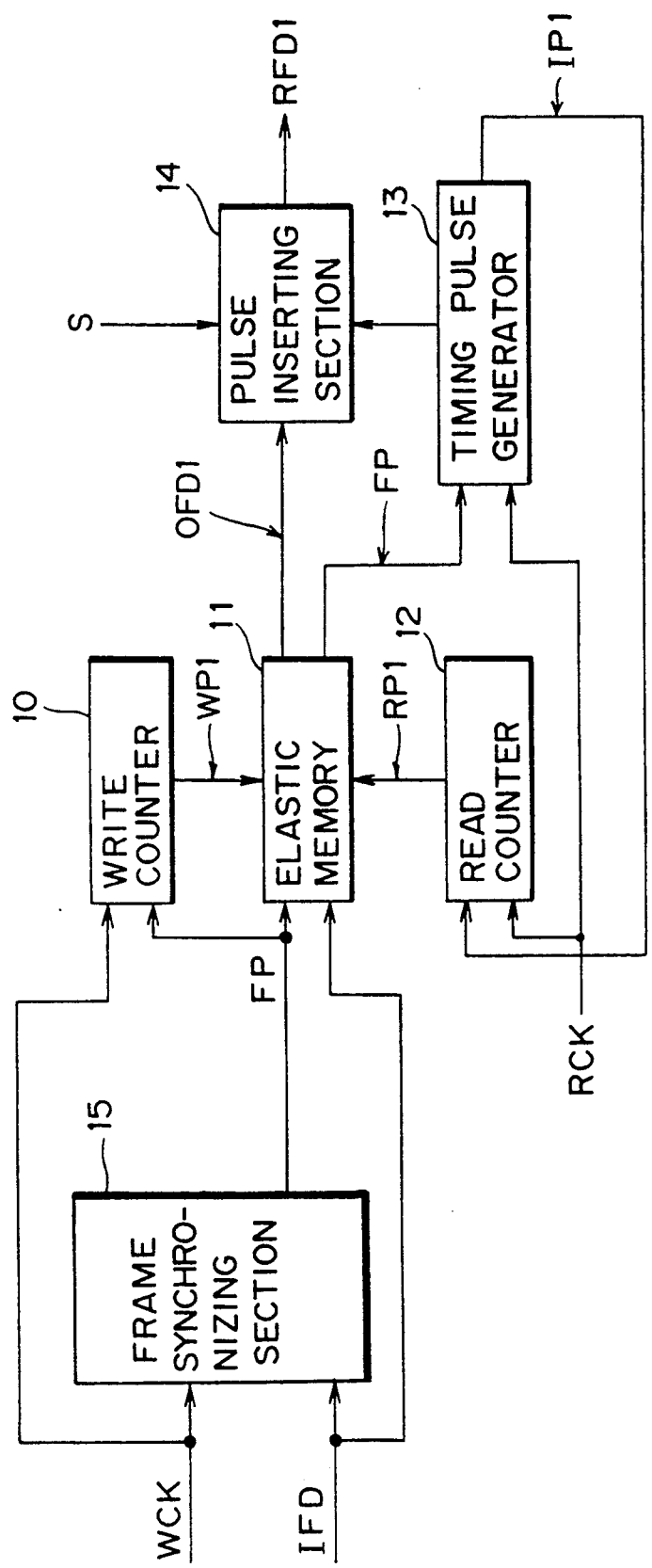
FIG. 5 is a block diagram of a transmitter of another digital data radio transmission system according to a second embodiment of the invention.

Referring now to FIG. 5, the second embodiment of the invention is described below. The second embodiment includes a frame synchronizing section 15 that admits write clock pulses WCK and input frame data IFD to establish frame synchronization. In turn, the frame synchronizing section 15 supplies frame position pulses FP to the elastic memory 11. Whereas the above-described first embodiment has the frame position pulses FP externally generated and input to the elastic memory 11, the second embodiment gets the frame synchronizing section 15 to generate the frame position pulses FP in accordance with the write clock pulses WCK and the input frame data IFD, the FP being input to the elastic memory 11. In this manner, the second embodiment needs one less input connection than the first embodiment.

As many apparently different embodiments of the present invention may be made without departing from the spirit and scope thereof, it is to be understood that the invention is not limited to the specific embodiments described herein except as defined in the appended claims.

What is claimed is:

1. A digital data radio transmission system for velocity-modulating input frame data, adding signals having a predetermined number of bits to said input frame data, and transmitting the resulting data as radio frame data, said system comprising:
    means for generating frame position pulses;
    writing means for dividing write clock pulses under control of the frame position pulses generated by said means for generating frame position pulses and for outputting the divided write clock pulses as write pulses;
    storing means for receiving said write pulses from said writing means and for temporarily storing said input frame data and said frame position pulses according to said write pulses and outputting output frame data and frame position pulses;
    timing pulse generating means for receiving said frame position pulses from said storing means and for outputting first and second control pulses in response to a supply of read clock pulses, the operation of said timing pulse generating means being controlled by said frame position pulses;
    reading means for dividing said read clock pulses by the same number as the write clock pulses under control of said first control pulses and for outputting the divided read clock pulses as read pulses to said storing means; and pulse inserting means for receiving the output frame data from said storing means and said second control pulses from said timing pulse generating means and for generating the radio frame data by inserting auxiliary pulses under control of said timing pulse generating means into the output frame data output from said storing means in response to said write pulses.

2. A digital data radio transmission system according to claim 1, wherein said frame position pulse generating means comprises frame synchronizing means for receiving said write clock pulses and said input frame data to establish frame synchronization, thereby generating the frame position pulses.

* * * * *